US011784875B1

(12) United States Patent
Sundararajan et al.

(10) Patent No.: US 11,784,875 B1
(45) Date of Patent: Oct. 10, 2023

(54) SYSTEMS AND METHODS FOR AUTOMATIC LICENSE MANAGEMENT OF CARRIER NEUTRAL FACILITY (CNF) SERVICES

(71) Applicant: Cisco Technology, Inc., San Jose, CA (US)

(72) Inventors: Balaji Sundararajan, Fremont, CA (US); Giorgio Valentini, Walnut Creek, CA (US); Madhuri Kolli, San Jose, CA (US); Venkat Venkatapathy, Fremont, CA (US); Gokul Krishnan, Milpitas, CA (US); Pradeep Kanavihalli Subramanyasetty, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/816,012

(22) Filed: Jul. 29, 2022

(51) Int. Cl.
| H04L 41/0895 | (2022.01) |
| H04L 41/22 | (2022.01) |
| G06F 21/10 | (2013.01) |
| H04L 41/0806 | (2022.01) |
| H04L 41/0894 | (2022.01) |
| H04L 41/085 | (2022.01) |

(52) U.S. Cl.
CPC ........ *H04L 41/0806* (2013.01); *G06F 21/105* (2013.01); *H04L 41/085* (2013.01); *H04L 41/0894* (2022.05); *H04L 41/0895* (2022.05); *H04L 41/22* (2013.01)

(58) Field of Classification Search
CPC ....... H04L 41/08; H04L 41/0893–0895; H04L 63/108; G06F 21/10–105
See application file for complete search history.

(56) References Cited

U.S. PATENT DOCUMENTS

| 10,649,630 B1* | 5/2020 | Vora ...................... G06F 21/105 |
| 11,184,252 B2* | 11/2021 | Clarke ................ G06F 9/45558 |
| 2011/0131134 A1 | 6/2011 | Ferris et al. |
| 2011/0251937 A1 | 10/2011 | Falk et al. |
| 2015/0128293 A1* | 5/2015 | Hitomi .................. G06F 21/105 726/29 |

(Continued)

FOREIGN PATENT DOCUMENTS

WO 2017188682 A1 11/2017

*Primary Examiner* — Brendan Y Higa
(74) *Attorney, Agent, or Firm* — Baker Botts L.L.P.

(57) ABSTRACT

According to some embodiments, a method includes receiving, from a graphical user interface, an indication that a user has purchased licenses associated with a CNF. The method further includes sending, to a second computing system of a CNF, first instructions regarding the licenses purchased by the user. The method further includes receiving an indication that the user wishes to deploy a particular router in the CNF with a particular data connection and retrieving, from the second computing system of the CNF, a list of licenses previously purchased by the user. The method further includes automatically determining, from the list of licenses, appropriate licenses for the particular router that the user wishes to deploy in the CNF. The method further includes sending second instructions that are operable to deploy the particular router in the CNF with the particular data connection and apply the determined licenses to the deployed particular router.

20 Claims, 3 Drawing Sheets

(56) References Cited

U.S. PATENT DOCUMENTS

| | | | |
|---|---|---|---|
| 2015/0193897 A1* | 7/2015 | Li | G06Q 10/00 |
| | | | 705/310 |
| 2017/0104609 A1* | 4/2017 | McNamee | H04W 4/24 |
| 2018/0131514 A1 | 5/2018 | Jones et al. | |
| 2019/0132211 A1* | 5/2019 | Yeung | H04L 67/10 |
| 2019/0268244 A1* | 8/2019 | Blakeman | H04L 41/22 |
| 2019/0334788 A1* | 10/2019 | Lacey | G06F 21/105 |
| 2019/0370436 A1* | 12/2019 | Karademir | G06F 21/12 |
| 2020/0099591 A1* | 3/2020 | Clarke | G06F 16/1824 |
| 2021/0034715 A1* | 2/2021 | Nosov | H04L 67/53 |
| 2021/0111981 A1* | 4/2021 | Nahata | H04L 41/40 |
| 2021/0182362 A1 | 6/2021 | Fan et al. | |
| 2021/0203550 A1* | 7/2021 | Thakkar | H04L 63/0272 |
| 2022/0043642 A1* | 2/2022 | Maturi | G06F 21/105 |

* cited by examiner

SYSTEMS AND METHODS FOR AUTOMATIC LICENSE MANAGEMENT OF CARRIER NEUTRAL FACILITY (CNF) SERVICES

TECHNICAL FIELD

This disclosure generally relates to Carrier Neutral Facilities (CNF), and more specifically to systems and methods for automatic license management of CNF Services.

BACKGROUND

A Carrier Neutral Facility (CNF) is a facility that operates independently of network providers and provides interconnection between multiple telecommunication carriers and colocation providers. A CNF may provide various services such as data storage, physical routers, virtual routers, and other computing systems. In addition, a CNF may provide data connections to multiple different cloud networks. For example, a CNF may provide a data connection from a router to a global cloud network such as SalesForce.

BRIEF DESCRIPTION OF THE DRAWINGS

For a more complete understanding of the disclosed embodiments and their features and advantages, reference is now made to the following description, taken in conjunction with the accompanying drawings, in which.

DESCRIPTION OF EXAMPLE EMBODIMENTS

Overview

The present disclosure relates generally to systems and methods for automatically connecting to and applying licenses for services at carrier neutral facilities (CNFs). A CNF is a facility that operates independently of network providers and functions to provide interconnection between multiple telecommunication carriers and colocation providers. A CNF may provide various services such as data storage, physical routers, virtual routers, and other computing systems. In addition, a CNF may provide data connections to multiple different public and private cloud networks. For example, a CNF may provide a data connection from a router within the CNF to a global cloud network such as SalesForce. In general, licenses for services at a CNF are manually purchased, applied, and managed by personnel. This is a tedious and labor-intensive endeavor that is prone to mistakes and oversights. For example, if a company switches from an old software application to a new software application, any previously-purchased licenses for the old software application may go unused.

According to some embodiments, a system includes a first computing system that is communicatively coupled to a second computing system of a CNF. The first computing system is configured to provide a user interface for provisioning a Software-Defined Wide Area Network (SD-WAN). The first computing system is further configured to receive, from the user interface, an indication that a user has purchased a first license for a router to be deployed in the CNF and a second license for a data connection. The first computing system is further configured to send to the second computing system of the CNF, via an Application Programming Interface (API), one or more first instructions regarding the first and second licenses purchased by the user. The first computing system is further configured to receive, from the user interface, an indication that the user wishes to deploy a particular router in the CNF with a particular data connection and to retrieve, from the second computing system of the CNF via the API, a list of licenses previously purchased by the user. The first computing system is further configured to automatically determine a plurality of appropriate licenses from the list of licenses. The plurality of appropriate licenses include an appropriate license for the particular router that the user wishes to deploy in the CNF and an appropriate license for the particular data connection. The first computing system is further configured to send to the second computing system of the CNF, via the API, one or more second instructions that are operable to deploy the particular router in the CNF with the particular data connection and to apply the determined plurality of appropriate licenses to the deployed particular router in the CNF with the particular data connection.

According to another embodiment, a method by a first computing system includes receiving, from a graphical user interface, an indication that a user has purchased a plurality of licenses associated with a CNF. The method further includes sending, to a second computing system of the CNF, one or more first instructions regarding the plurality of licenses purchased by the user. The method further includes receiving, from the user interface, an indication that the user wishes to deploy a particular router in the CNF with a particular data connection and retrieving, from the second computing system of the CNF, a list of licenses previously purchased by the user. The method further includes automatically determining, from the list of licenses, a plurality of appropriate licenses for the particular router that the user wishes to deploy in the CNF. The method further includes sending to the second computing system of the CNF, one or more second instructions. The one or more second instructions are operable to deploy the particular router in the CNF with the particular data connection and apply the determined plurality of appropriate licenses to the deployed particular router in the CNF with the particular data connection.

Technical advantages of certain embodiments of this disclosure may include one or more of the following. Certain systems and methods described provide systems and methods for automatic license application and management for services at CNFs. Unlike existing solutions where licenses for services at a CNF are manually purchased, applied, and managed by personnel, embodiments of this disclosure provide systems and methods that automatically select and apply licenses for services at CNFs. By automatically selecting and applying licenses at a CNF, the utilization of licenses may be maximized, and a company may avoid paying for licenses that are not being used. Furthermore, by automatically selecting and applying licenses for services at CNFs, network bandwidth and computer resources (e.g., computer memory and processing power) may be optimized by not having to be reserved for unused, under-utilized, or incorrect licenses. Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

The present disclosure relates generally to systems and methods for automatically connecting to and applying licenses for services at carrier neutral facilities (CNFs). A CNF is a facility that operates independently of network providers and functions to provide interconnection between multiple telecommunication carriers and colocation providers. A CNF may provide various services such as data storage, physical routers, virtual routers, and other computing systems. In addition, a CNF may provide data connections to multiple different public and private cloud networks. For example, a CNF may provide a data connection from a router within the CNF to a global cloud network such as SalesForce. In general, licenses for services at a CNF are typically manually purchased, applied, and managed. This is a tedious and labor-intensive endeavor that is prone to mistakes and oversights. For example, if a company switches from an old software application to a new software application, any previously-purchased licenses for the old software application may go unused.

To address these and other problems associated with licenses for services provided by a CNF, the enclosed embodiments provide systems and methods for automatically selecting and applying licenses for services at a CNF. To do so, some embodiments of the disclosure communicate with a computing system of a CNF using an API in order to inform the CNF of licenses purchased by a user. For example, certain embodiments may send one or more first instructions to the computing system of the CNF regarding licenses purchased by the user for certain routers and data connections. The CNF may store the information about the purchased licenses in a local database. Then, once a user decides to deploy a particular router in the CNF with a particular data connection, embodiments of the disclosure may retrieve a list of licenses previously purchased by the user from the computing system of the CNF. The disclosed embodiments may then automatically determine, from the list of licenses, one or more appropriate licenses for the particular router that the user wishes to deploy in the CNF. Once the appropriate licenses are determined, the disclosed embodiments may send instructions to the CNF in order to deploy the particular router in the CNF with the particular data connection and to apply the determined licenses to the deployed particular router in the CNF with the particular data connection. As a result, licenses for CNF services may be automatically selected and applied without requiring any manual oversight from personnel.

Figure 1:
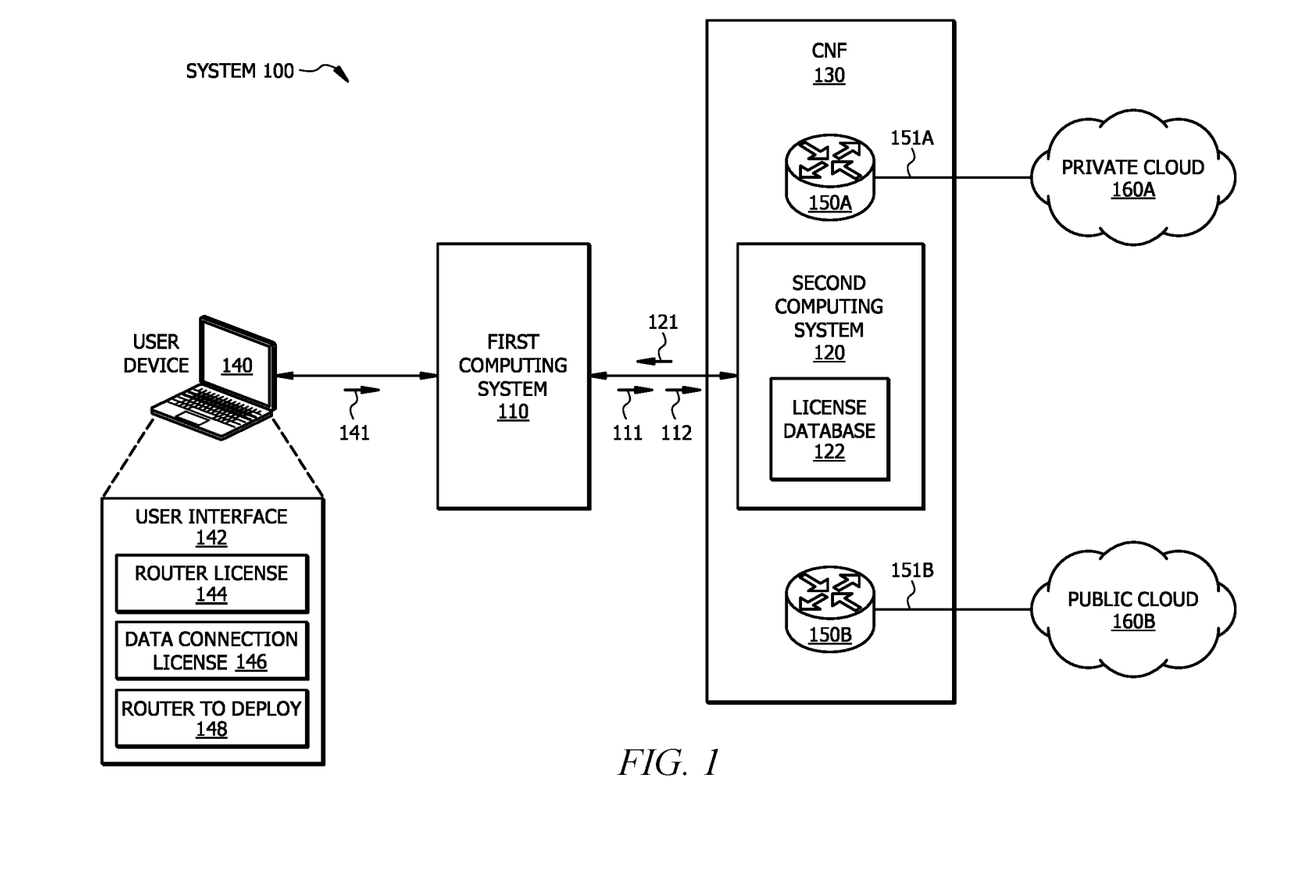
FIG. 1 is a diagram illustrating a system for automatic license management of CNF services, according to some embodiments.

FIG. 1 illustrates a network diagram illustrating a system 100 for automatic license management of CNF services. System 100 includes a first computing system 110, a second computing system 120 of a CNF 130, and a user device 140. User device 140 is communicatively coupled with first computing system 110 using any appropriated wired or wireless communication system or network. Similarly, first computing system 110 is communicatively coupled with second computing system 120 using any appropriated wired or wireless communication system or network. In some embodiments, first computing system 110 communicates with second computing system 120 using an application programming interface (API). CNF 130 provides routers 150 (e.g., 150A-B) that may have data connections 151 (e.g., 151A-B) to cloud networks 160 (e.g., private cloud network 160A and public cloud network 160B).

In general, system 100 automatically selects and applies licenses for services at CNF 130. To do so, first computing system 110 communicates with second computing system 120 of CNF 130 using an API in order to inform CNF 130 of licenses purchased by a user. For example, first computing system 110 may send one or more first instructions 111 to second computing system 120 regarding licenses purchased by the user for certain routers 150 and data connections 151. CNF 130 may store the information about the purchased licenses in a local license database 122. Then, once a user decides to deploy a particular router 150 in the CNF 130 with a particular data connection 151, first computing system 110 may retrieve a list of licenses 121 previously purchased by the user from second computing system 120. First computing system 110 may then automatically determine, from list of licenses 121, one or more appropriate licenses for the particular router 150 that the user wishes to deploy in the CNF 130. Once the appropriate licenses are determined, the disclosed embodiments may send second instructions 112 to second computing system 120 in order to deploy the particular router 150 in the CNF 130 with the particular data connection 151 and to apply the determined licenses to the deployed particular router 150 in the CNF 130 with the particular data connection 151. As a result, licenses for CNF services may be automatically selected and applied without requiring any manual oversight from personnel.

First computing system 110 and second computing system 120 may be any appropriate computing system in any suitable physical form. As example and not by way of limitation, first computing system 110 and second computing system 120 may each be an embedded computer system, a system-on-chip (SOC), a single-board computer system (SBC) (such as, for example, a computer-on-module (COM) or system-on-module (SOM)), a desktop computer system, a laptop or notebook computer system, a mainframe, a mesh of computer systems, a mobile telephone, a personal digital assistant (PDA), a server, a tablet computer system, an augmented/virtual reality device, or a combination of two or more of these. Where appropriate, first computing system 110 and second computing system 120 may each include one or more computer systems; be unitary or distributed; span multiple locations; span multiple machines; span multiple data centers; or reside in a cloud, which may include one or more cloud components in one or more networks. Where appropriate, first computing system 110 and second computing system 120 may each perform without substantial spatial or temporal limitation one or more steps of one or more methods described or illustrated herein. As an example and not by way of limitation, first computing system 110 may perform in real time or in batch mode one or more steps of one or more methods described or illustrated herein. First computing system 110 may perform at different times or at different locations one or more steps of one or more methods described or illustrated herein, where appropriate. A particular example of a first computing system 110 and a second computing system 120 is described in reference to FIG. 3.

CNF 130 is any facility that operates independently of network providers and provides interconnection between multiple telecommunication carriers and colocation providers. CNF 130 may provide various services such as data storage, physical and virtual routers 150, and other computing systems. In addition, CNF 130 provides data connections 151 to multiple different cloud networks 160. For example, CNF 130 may provide a data connection from a router to a global cloud network such as SalesForce. In some embodiments, first computing system 110 is associated with an entity that is separate from CNF 130.

User device 140 is any appropriate device for communicating with components of first computing system 110 over a communications network (e.g., the internet). For example, user device 140 may be a handheld computing device such as a smartphone, wearable computer glasses, a smartwatch, a tablet computer, a laptop computer, a desktop computer, and the like. User device 140 may include an electronic display, a processor such processor 302, and memory such as memory 304.

The electronic display of user device 140 may display user interface 142 that permits a user to provision a Software-Defined Wide Area Network (SD-WAN) and to perform actions related to licenses for services at CNF 130. In some embodiments, user interface 142 may include one or more user-selectable options that permit the user to select and purchase a router license 144 for a router to be deployed at CNF 130. For example, the user may select to purchase a first license for a virtual or physical router to be located in CNF 130 that is in a particular geographical region (e.g., a particular city). Once the user purchases a particular router license 144, user device 140 may send a license indication 141 to system 100 that indicates that the user has purchased the particular router license 144.

In some embodiments, user interface 142 may include one or more user-selectable options that permit the user to select and purchase a data connection license 146 for a router in CNF 130. In some embodiments, data connection license 146 is a license for a data connection to a Software-As-A-Service (SAAS) cloud, a license for an in-metro data connection, a license for an intra-metro data connection, and the like. For example, the user may select to purchase a second license for a data connection 151 between a particular router 150 and a particular cloud network 160. Once the user purchases a particular data connection license 146, user device 140 may send license indication 141 to system 100 that indicates that the user has purchased the particular data connection license 146. In turn, first computing system 110 may send to second computing system 120, via an API, one or more first instructions 111 regarding the first and second licenses purchased by the user. First instructions 111 generally indicate which licenses (e.g., router licenses 144 and data connection licenses 146) have been purchased by a user.

In some embodiments, second computing system 120 includes license database 122 for storing licenses purchased by users. License database 122 may be any appropriate database that is stored either internally within second computing system 120 or externally to second computing system 120. In general, second computing system 120 updates license database 122 based on first instructions 111 received from first computing system 110.

Router 150 receives, creates, stores and/or sends data along a path of a network. Router 150 may include one or more endpoints and/or one or more redistribution points that recognize, process, and forward data to other routers or nodes. Router 150 may be a virtual and/or a physical router.

Cloud network 160 is any appropriate private or public cloud network. For example, cloud network 160 may be a private cloud network 160A. In general, a private cloud network provides computing services either over the Internet or a private internal network only to select users instead of the general public. As another example, cloud network 160 may be a public cloud network 160B such as SalesForce.

In operation, system 100 automatically selects and applies licenses for services at CNF 130. To do so, first computing system 110 communicates with second computing system 120 of CNF 130 using an API in order to inform CNF 130 of licenses purchased by a user. For example, first computing system 110 may send one or more first instructions 111 to second computing system 120 regarding licenses purchased by the user for certain routers 150 and data connections 151. As a specific example, first computing system 110 may receive from user interface 142 a license indication 141 that indicates that a user has purchased a first router license 144 for a router 150 to be deployed in CNF 130. Additionally, first computing system 110 may receive from user interface 142 a license indication 141 (e.g., the same license indication 141 or a separate license indication 141) that indicates that the user has purchased a second data connection license 146 for a data connection 151. First computing system 110 may then send one or more first instructions 111 regarding the first and second licenses purchased by the user to second computing system 120 of CNF 130, via, for example, an API. After receiving first instructions 111, CNF 130 may store the information about the purchased licenses in license database 122.

At some point after purchasing one or more licenses via user interface 142, a user may decide to deploy a particular router 150 in CNF 130 with a particular data connection 151. To indicate this, the user may select a particular router to deploy 148 via user interface 142. First computing system 110 may then receive, from user interface 142, an indication that the user wishes to deploy the particular router 150 in CNF 130 with the particular data connection 151. In response, first computing system 110 may retrieve list of licenses 121 previously purchased by the user from second computing system 120 (e.g., second computing system 120 may form list of licenses 121 by consulting license database 122). First computing system 110 may then automatically determine, from list of licenses 121, appropriate licenses for the particular router 150 that the user wishes to deploy in the CNF 130. The appropriate licenses may include, for example, an appropriate license for the particular router 150 that the user wishes to deploy in CNF 130 and an appropriate license for the particular data connection 151 for the desired router 150.

After the appropriate licenses are determined by first computing system 110, first computing system 110 sends second instructions 112 to second computing system 120 in order to deploy the particular router 150 in the CNF 130 with the particular data connection 151. Second instructions 112 also instruct second computing system 120 to apply the determined licenses to the deployed particular router 150 in the CNF 130 with the particular data connection 151. As a result, licenses for CNF services may be automatically selected and applied without requiring any manual oversight from personnel.

To automatically determine the appropriate licenses from list of licenses 121, first computing system 110 may analyze multiple factors. As a first example, first computing system 110 may compare a physical location of the particular router 150 in CNF 130 to license-specific locations of the licenses purchased by the user and stored in license database 122. For instance, if the particular router 150 is physically located in City A, first computing system 110 may select a license for City A previously purchased by the user. As a second example, first computing system 110 may compare a type of the desired data connection to types of data connection licenses purchased by the user and stored in license database 122. For instance, if the particular data connection is to a SAAS cloud, first computing system 110 may select a SAAS license previously purchased by the user. As a third example, first computing system 110 may compare a size of the particular router 150 in CNF 130 to sizes of licenses previously purchased by the user and stored in license database 122. For instance, if the particular router 150 is a "medium" sized router, first computing system 110 may select a "medium" sized license (or higher) previously purchased by the user. As a fourth example, first computing system 110 may compare a bandwidth of the particular router 150 in CNF 130 to bandwidths of the licenses purchased by the user and stored in license database 122. For instance, if the bandwidth of particular router 150 is a certain amount, first computing system 110 may select a license that has a bandwidth that meets or exceed the desired bandwidth.

Figure 2:
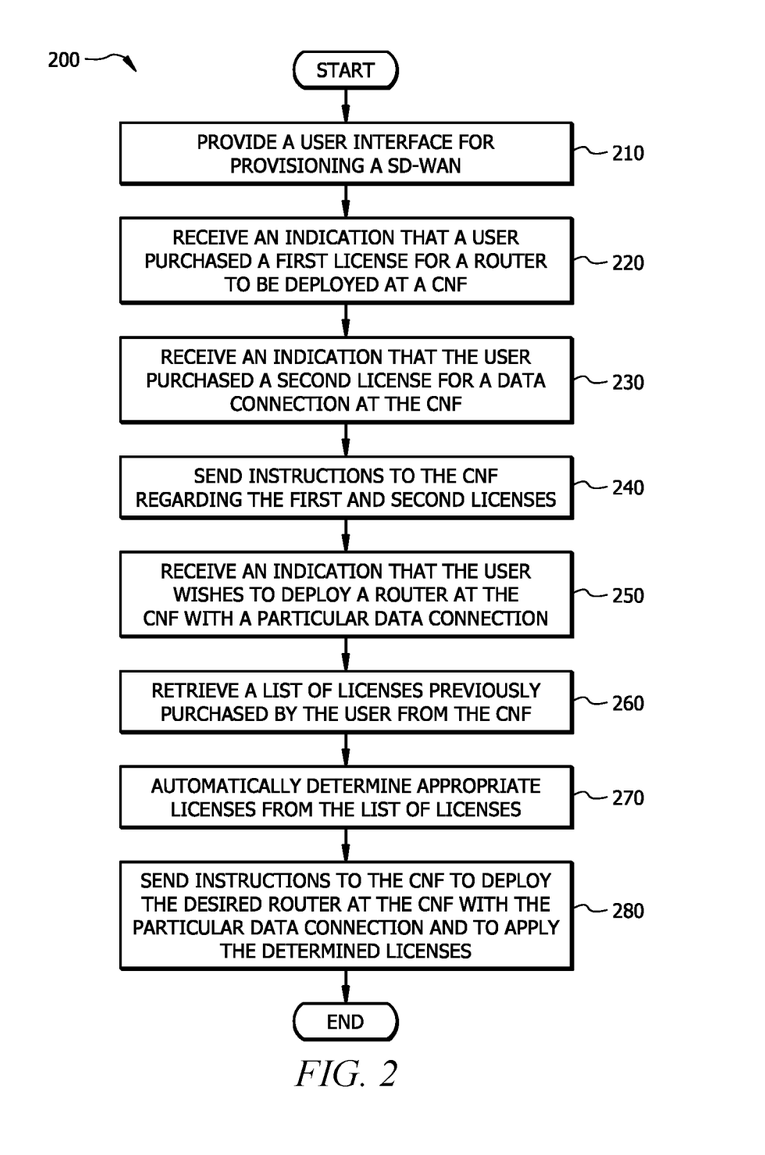
FIG. 2 is a flow diagram illustrating an example method for automatic license management of CNF services, according to some embodiments.

FIG. 2 is a flow diagram illustrating an example method 200 for automatic license management of CNF services. In some embodiments, method 200 may be performed by first computing system 110. Method 200 may begin in step 210 where method 200 provides a user interface for provisioning a SD-WAN. In some embodiments, the user interface is user interface 142. The user interface may include multiple user-selection options for a user to purchase licenses and choose to deploy a router at a CNF. For example, the user interface may include options to select a router license 144, a data connection license 146, and a router to deploy 148.

In step 220, method 200 receives, from the user interface of step 210, an indication that a user has purchased a first license for a router to be deployed in the CNF. In some embodiments, the indication is license indication 141. In some embodiments, the first license is router license 144. In some embodiments, the router is router 150.

In step 230, method 200 receives, from the user interface of step 210, an indication that the user has purchased a second license for a data connection. In some embodiments, the indication is license indication 141. In some embodiments, the second license is data connection license 146. In some embodiments, the data connection is data connection 151.

In step 240, method 200 sends to a second computing system of the CNF, via an API, one or more first instructions regarding the first and second licenses purchased by the user. In some embodiments, the second computing system is second computing system 120. In some embodiments, the first instructions are first instructions 111.

In step 250, method 200 receives, from the user interface of step 210, an indication that the user wishes to deploy a particular router in the CNF with a particular data connection. In some embodiments, the particular router to be deployed is selected using router to deploy 148.

In step 260, method 200 retrieves, from the second computing system of the CNF via the API, a list of licenses previously purchased by the user. In some embodiments, the list of licenses is list of licenses 121. In some embodiments, the list of licenses is determined from license database 122.

In step 270, method 200 automatically determines a plurality of appropriate licenses from the list of licenses received in step 260. In some embodiments, the plurality of appropriate licenses includes an appropriate license for the particular router that the user wishes to deploy in the CNF and an appropriate license for the particular data connection. In some embodiments, step 270 includes determining the plurality of appropriate licenses from the list of licenses based at least in part on a physical location of the particular router in the CNF, a size of the particular router in the CNF, and a bandwidth of the particular router in the CNF.

In step 280, method 200 sends to the second computing system of the CNF, via the API, one or more second instructions. In some embodiments, the second instructions are second instructions 112 and are operable to 1) deploy the particular router in the CNF with the particular data connection, and 2) apply the determined plurality of appropriate licenses to the deployed particular router in the CNF with the particular data connection. After step 280, method 200 may end.

Figure 3:
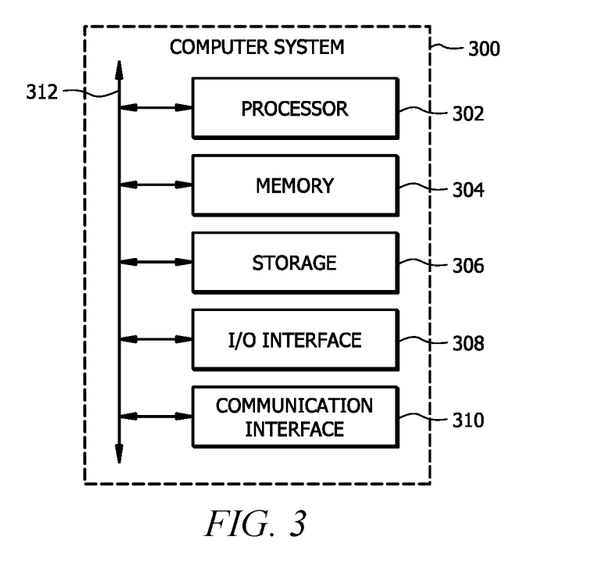
FIG. 3 is an example computer system that can be utilized to implement aspects of the various technologies presented herein, according to some embodiments.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Certain embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The invention claimed is:

1. A system comprising:
a first computing system communicatively coupled to a second computing system of a carrier neutral facility (CNF), wherein the first computing system is configured to:
provide a user interface for provisioning a Software-Defined Wide Area Network (SD-WAN);
receive, from the user interface, an indication that a user has purchased a first license for a router to be deployed in the CNF;
receive, from the user interface, an indication that the user has purchased a second license for a data connection;
send to the second computing system of the CNF, via an Application Programming Interface (API), one or more first instructions regarding the first and second licenses purchased by the user;
receive, from the user interface, an indication that the user wishes to deploy a particular router in the CNF with a particular data connection;
retrieve, from the second computing system of the CNF via the API, a list of licenses previously purchased by the user;
automatically determine a plurality of appropriate licenses from the list of licenses, the plurality of appropriate licenses comprising:
an appropriate license for the particular router that the user wishes to deploy in the CNF; and
an appropriate license for the particular data connection; and send to the second computing system of the CNF, via the API, one or more second instructions, the one or more second instructions operable to:
  deploy the particular router in the CNF with the particular data connection; and
  apply the determined plurality of appropriate licenses to the deployed particular router in the CNF with the particular data connection.

2. The system of claim 1, wherein the particular router deployed in the CNF is:
  a virtual router; or
  a physical router.

3. The system of claim 1, wherein the first computing system is associated with an entity that is separate from the CNF.

4. The system of claim 1, wherein automatically determining the plurality of appropriate licenses from the list of licenses is based at least in part on:
  a physical location of the particular router in the CNF;
  a size of the particular router in the CNF; and
  a bandwidth of the particular router in the CNF.

5. The system of claim 1, wherein the license for the particular data connection comprises a license for:
  a data connection to a Software-As-A-Service (SAAS) cloud;
  an in-metro data connection; or
  an intra-metro data connection.

6. A method by a first computing system, the method comprising:
  receiving, from a graphical user interface, an indication that a user has purchased a plurality of licenses associated with a carrier neutral facility (CNF);
  sending, to a second computing system of the CNF, one or more first instructions regarding the plurality of licenses purchased by the user;
  receiving, from the user interface, an indication that the user wishes to deploy a particular router in the CNF with a particular data connection;
  retrieving, from the second computing system of the CNF, a list of licenses previously purchased by the user;
  automatically determining, from the list of licenses, a plurality of appropriate licenses for the particular router that the user wishes to deploy in the CNF; and
  sending to the second computing system of the CNF, one or more second instructions, the one or more second instructions operable to:
    deploy the particular router in the CNF with the particular data connection; and
    apply the determined plurality of appropriate licenses to the deployed particular router in the CNF with the particular data connection.

7. The method of claim 6, wherein the plurality of licenses associated with the CNF comprises:
  a first license for a router to be deployed in the CNF; and
  a second license for a data connection for the router to be deployed in the CNF.

8. The method of claim 7, wherein the second license for the data connection comprises a license for:
  a data connection to a Software-As-A-Service (SAAS) cloud;
  an in-metro data connection; or
  an intra-metro data connection.

9. The method of claim 6, wherein the plurality of appropriate licenses comprises:
  an appropriate license for the particular router that the user wishes to deploy in the CNF; and
  an appropriate license for the particular data connection.

10. The method of claim 6, wherein the particular router deployed in the CNF is:
  a virtual router; or
  a physical router.

11. The method of claim 6, wherein the first computing system is associated with an entity that is separate from the CNF.

12. The method of claim 6, wherein automatically determining the plurality of appropriate licenses from the list of licenses is based at least in part on:
  a physical location of the particular router in the CNF;
  a size of the particular router in the CNF; and
  a bandwidth of the particular router in the CNF.

13. The method of claim 6, wherein the one or more first instructions and the one or more second instructions are sent to the second computing system of the CNF via an Application Programming Interface (API).

14. One or more computer-readable non-transitory storage media embodying instructions that, when executed by a processor, cause the processor to perform operations comprising:
  receiving, from a graphical user interface, an indication that a user has purchased a plurality of licenses associated with a carrier neutral facility (CNF);
  sending, to a second computing system of the CNF, one or more first instructions regarding the plurality of licenses purchased by the user;
  receiving, from the user interface, an indication that the user wishes to deploy a particular router in the CNF with a particular data connection;
  retrieving, from the second computing system of the CNF, a list of licenses previously purchased by the user;
  automatically determining, from the list of licenses, a plurality of appropriate licenses for the particular router that the user wishes to deploy in the CNF; and
  sending to the second computing system of the CNF, one or more second instructions, the one or more second instructions operable to:
    deploy the particular router in the CNF with the particular data connection; and
    apply the determined plurality of appropriate licenses to the deployed particular router in the CNF with the particular data connection.

15. The one or more computer-readable non-transitory storage media of claim 14, wherein the plurality of licenses associated with the CNF comprises:
  a first license for a router to be deployed in the CNF; and
  a second license for a data connection for the router to be deployed in the CNF.

16. The one or more computer-readable non-transitory storage media of claim 15, wherein the second license for the data connection comprises a license for:
  a data connection to a Software-As-A-Service (SAAS) cloud;
  an in-metro data connection; or
  an intra-metro data connection.

17. The one or more computer-readable non-transitory storage media of claim 14, wherein the plurality of appropriate licenses comprises:
  an appropriate license for the particular router that the user wishes to deploy in the CNF; and
  an appropriate license for the particular data connection.

18. The one or more computer-readable non-transitory storage media of claim 14, wherein the particular router deployed in the CNF is:
  a virtual router; or a physical router.

19. The one or more computer-readable non-transitory storage media of claim 14, wherein the first computing system is associated with an entity that is separate from the CNF.

20. The one or more computer-readable non-transitory storage media of claim 14, wherein automatically determining the plurality of appropriate licenses from the list of licenses is based at least in part on:
   a physical location of the particular router in the CNF;
   a size of the particular router in the CNF; and
   a bandwidth of the particular router in the CNF.

* * * * *